United States Patent
Budagavi

(10) Patent No.: US 7,903,870 B1
(45) Date of Patent: Mar. 8, 2011

(54) DIGITAL CAMERA AND METHOD

(75) Inventor: Madukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 820 days.

(21) Appl. No.: 11/677,649

(22) Filed: Feb. 22, 2007

Related U.S. Application Data

(60) Provisional application No. 60/776,486, filed on Feb. 24, 2006.

(51) Int. Cl.
 *G06K 9/00* (2006.01)
(52) U.S. Cl. .......... 382/162; 382/167; 382/117; 382/275
(58) Field of Classification Search .................. 382/167, 382/165, 117, 274, 275, 103, 118, 119
See application file for complete search history.

(56) References Cited

U.S. PATENT DOCUMENTS

| | | | |
|---|---|---|---|
| 7,116,820 B2* | 10/2006 | Luo et al. | 382/167 |
| 7,454,040 B2* | 11/2008 | Luo et al. | 382/117 |
| 2005/0031224 A1* | 2/2005 | Prilutsky et al. | 382/275 |
| 2005/0041121 A1* | 2/2005 | Steinberg et al. | 348/239 |
| 2005/0047656 A1* | 3/2005 | Luo et al. | 382/167 |
| 2005/0140801 A1* | 6/2005 | Prilutsky et al. | 348/239 |
| 2006/0008152 A1* | 1/2006 | Kumar et al. | 382/190 |
| 2006/0018517 A1* | 1/2006 | Chen et al. | 382/115 |
| 2006/0029265 A1* | 2/2006 | Kim et al. | 382/118 |
| 2006/0120599 A1* | 6/2006 | Steinberg et al. | 382/167 |

* cited by examiner

*Primary Examiner* — Brian Q Le
*Assistant Examiner* — Mekonen Bekele
(74) *Attorney, Agent, or Firm* — Mima Abyad; Wade J. Brady, III; Frederick J. Telecky, Jr.

(57) ABSTRACT

Redeye removal methods detect redeyes in a two-step procedure. In the first step it detects faces in the input image and in the second step it searches for redeyes in the detected faces. The methods include the introduction of an efficient skin tone detector that reduces the average complexity of a Viola-Jones based face. We also introduce a summed area table (SAT) based optimization in our eye detector stage that reduces the complexity in the eye detector by a factor of 5× when compared to an optimized direct search method.

5 Claims, 10 Drawing Sheets

Figure 7 (prior art)   image pipeline

Figure 8 (prior art)   red-eye correction

DIGITAL CAMERA AND METHOD

CROSS-REFERENCE TO RELATED APPLICATIONS

This application claims priority from provisional Appl. No. 60/776,486, filed Feb. 24, 2006. The following co-assigned copending patent applications disclose related subject matter: application Ser. No. 11/559,003, filed Nov. 13, 2006.

BACKGROUND OF THE INVENTION

The present invention relates to digital video signal processing, and more particularly to architectures and methods for digital camera red-eye processing.

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

FIG. 7 is a typical functional block diagram for digital camera control and image processing (the "image pipeline"). The automatic focus, automatic exposure, and automatic white balancing are referred to as the 3A functions; and the image processing includes functions such as color filter array (CFA) interpolation, gamma correction, white balancing, color space conversion, and JPEG/MPEG compression/decompression (JPEG for single images and MPEG for video clips). Note that the typical color CCD consists of a rectangular array of photosites (pixels) with each photosite covered by a filter (the CFA): typically, red, green, or blue. In the commonly-used Bayer pattern CFA one-half of the photosites are green, one-quarter are red, and one-quarter are blue.

Typical digital cameras provide a capture mode with full resolution image or audio/visual clip processing plus compression and storage, a preview mode with lower resolution processing for immediate display, and a playback mode for displaying stored images or audio/visual clips.

Capture of an image including one or more human faces while using flash illumination of the scene frequently leads to the problem of "redeye": an artificial red appears around the pupils of the eyes in the faces. The red seems to be a reflection of the flash light from the blood vessels of the retinas in the eyes. Images of pets under flash illumination have a similar problem, the main difference being that the artificial color around the pupils varies (blue, green, yellow, et cetera).

Redeye is an objectionable artifact. There are currently three basic types of techniques for redeye mitigation and removal:

Redeye reduction: This technique is widely supported in current cameras. In this technique, one or more pre-exposure flashes are used to contract the pupil aperture, thereby reducing the probability of reflection of flash light from the retina. This technique consumes a lot of power and also involves a delay. This technique will not work if the subject is not looking at the camera during the pre-exposure flashes. Hence it is desirable to have an image processing approach wherein redeyes are removed in the captured image.

Semi-automatic techniques for redeye removal using image processing: In these techniques, the redeyes are removed from pictures by using image processing software typically running on a desktop computer. The user typically selects the region of redeyes in the redeye pictures. The redeyes are then removed by reducing or eliminating the chrominance information in the regions of selected redeyes.

Automatic redeye removal: In these techniques the redeye regions of the pictures are automatically detected and corrected. Automatic redeye removal is a new feature that is being introduced in digital still cameras; e.g., HP R707 and Nikon Coolpix 5200.

FIG. 8 illustrates a common automatic approach as described in Gaubatz et al., Automatic Red-Eye Detection and Correction, Proc. IEEE Intl. Conf. Image Processing I-804 (2002) which first detects faces in an image, then detects red eyes within the faces, and lastly corrects red-eye by desaturating the red pixels. U.S. Pat. Nos. 6,718,051 and 6,728,401 are similar.

OTHER REFERENCES

1. R. O. Duda, P. E. Hart, and D. G. Stork, Pattern Classification, $2^{nd}$ ed., John Wiley & Sons, NY.
2. M. Gaubatz and R. Ulichney, "Automatic redeye detection and correction", IEEE International Conference on Image Processing, 2002.
3. U.S. Pat. No. 6,278,491, "Apparatus and a method for automatically detecting and reducing redeye in a digital image".
4. US Patent Application Publication 2004/0213476, "Detecting and correcting redeye in a digital image". See also H. Luo et. al., "An efficient automatic redeye detection and correction algorithm," IEEE International Conference on Pattern Recognition, 2004.
5. US Patent Application Publication 2005/0058342, "Redeye detection based on red region detection with eye confirmation".
6. P. Viola and M. Jones, "Robust real-time object detection," In $2^{nd}$ Intl. Workshop on Statistical and Computational Theories of Vision—Modeling, Learning, Computing, and Sampling, 2002.
7. H. Rowley, S. Baluja, and T. Kanade, "Neural network-based face detection," IEEE Patt. Anal. Mach. Intell., vol. 20, pp. 22-38, 1998.
8. A. R. Smith, "Color gamut transform pairs," pp. 12-19, SIGGRAPH, 1978.
9. U.S. Pat. No. 6,407,777, "Redeye filter method and apparatus". See also P. Corcoran et. al., "Automated in-camera detection of flash-eye defects," IEEE Transactions on Consumer Electronics, vol. 51, No. 1, February 2005. See also US Patent Application Publication 2005/0041121, "Redeye filter method and apparatus".
10. US Patent Application Publication 20040240747, "Detection and correction of redeye features in digital images".
11. U.S. Pat. No. 6,718,051, "Redeye detection method".
12. U.S. Pat. No. 6,728,401, "Redeye removal using color image processing".
13. U.S. Pat. No. 6,252,976, "Computer program product for redeye detection".
14. K. J. Sung and D. J. Anderson, "A video eye tracking system based on a statistical algorithm," pp. 438-441, Proc. $36^{th}$ Midwest Symposium on Circuits and Systems, 1993.
15. A. Patti, K. Konstantinides, D. Tretter, and Q. Ling, "Automatic digital redeye reduction," IEEE Intl. Conf. Image Processing, 1998.

16. R. C. Gonzalez and R. E. Woods, Digital Image Processing, 2$^{nd}$ ed., Prentice-Hall Inc., 2002.

SUMMARY OF THE INVENTION

The present invention provides image processing with redeye removal by skin tone detection to simplify face detection and/or sum area table processing to simplify eye detection within a detected face.

DESCRIPTION OF THE PREFERRED EMBODIMENTS

1. Overview

Preferred embodiment redeye removal methods for digital image processing include a face detection with an initial skin tone detection plus subsequent cascaded feature detection and an eye detection with a sum of absolute tables detection.

Figure 9:
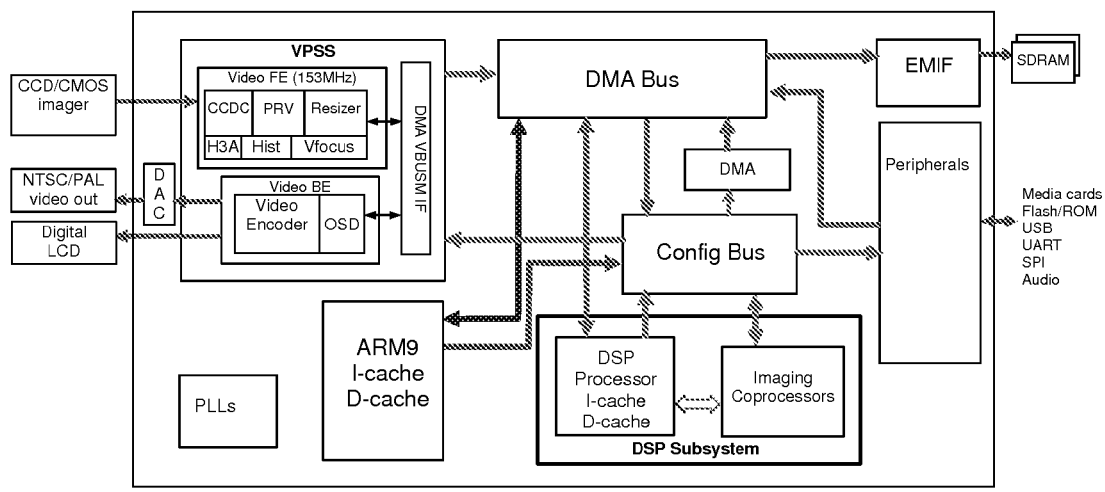
FIGS. 9-10 show a processor and network connections.
Figure 10:
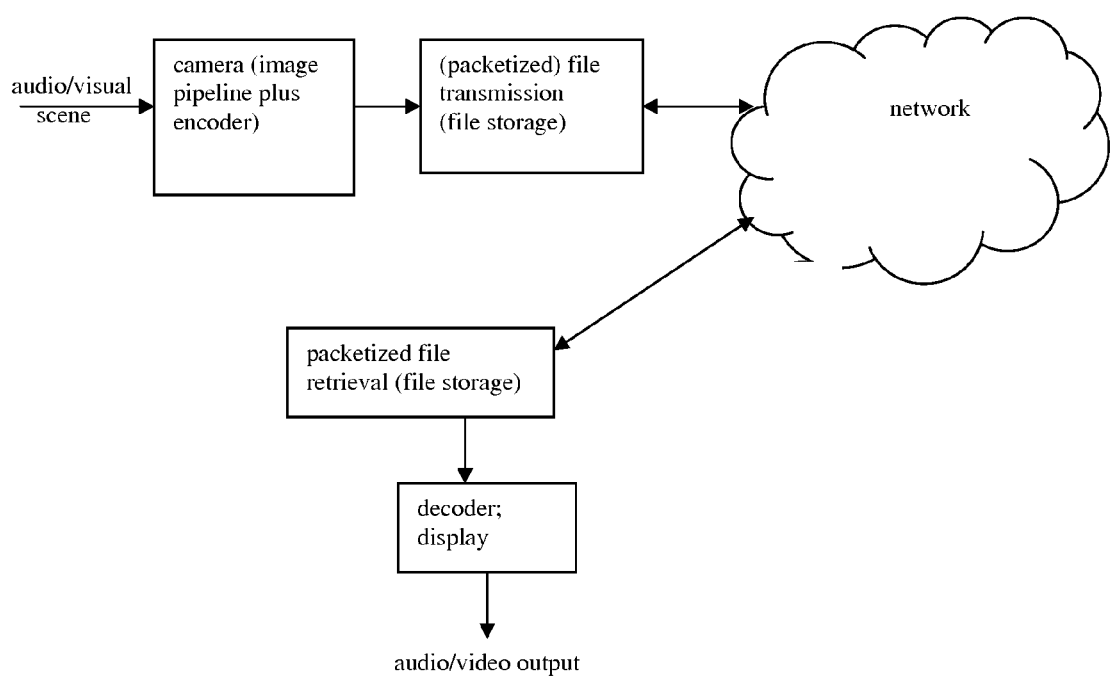

Preferred embodiment systems (e.g., digital cameras with flash) perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 9 is an example of digital camera hardware. A stored program in an onboard or external (flash EEP)ROM or FRAM could implement the signal processing. Further, the preferred embodiment methods could be separated from the image capture, such as raw image transmission over a network to an image processing device. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 10.

2. Review of Automatic Redeye Removal Techniques

Several automatic redeye removal techniques have been proposed in papers and patents. We provide a brief overview of some of the salient techniques in this section. These techniques mainly differ in the way they automatically detect redeye regions. In most of these techniques, redeye correction is carried out by reducing or eliminating the chrominance information in the regions of detected redeyes. Hence, we will focus on redeye detection only.

Redeye detection techniques can be broadly classified into the following two categories: (a) Machine learning based techniques and (b) Image segmentation and blob-labeling based techniques.

(a) Machine learning. In this category of techniques, face and/or eye detection is carried out by using machine learning techniques. Classifiers for face and/or eye are trained by using Neural networks, Support Vector Machines, or AdaBoost algorithms. By using trained classifiers, redeye detection is usually done in two steps: first detecting faces in the image, and then detecting the redeyes in the face. Some of the techniques in this category skip the face detection step and directly do eye detection.

Redeye removal techniques in the Machine learning category include different techniques from HP and from Microsoft. In [2], the Viola-Jones algorithm [6] is used for face detection and redeye detection is then carried out on the image region in detected faces. In [3], Rowley et. al.'s [7] neural network based face and eye detection technology is used. For detecting rotated faces, the authors propose to rotate the input image and to run the face/eye detector on the rotated images. In [4], eye detectors are trained by using the AdaBoost algorithm. The algorithm in [4] is inspired by the Viola-Jones algorithm. In [5], skin tone regions in the image are detected first and then eye detection is carried out in regions interior to the skin colored region by using Support Vector Machines.

(b) Image segmentation and blob-labeling. Techniques in this category basically segment the image into regions that potentially contain redeyes. E.g. Segmentation can be carried out by searching for red pixels with correct luminance and chrominance components. Color spaces typically used for color segmentation include CIELAB, Hue Saturation Lightness (HSL), Hue Saturation Value (HSV) [8], or YCbCr color spaces. The candidate regions after color segmentation are labeled by blob labeling operations [16]. These blobs or image objects are further analyzed to determine if they form a redeye. Redeyes are typically round in shape (though not always round in shape) and are located in the neighborhood of skin patches. They are also near the white colored sclera and usually contain a strong specular (bright white) component. Each of the blobs is analyzed to determine if it satisfies the above conditions. Any blob which satisfies all such conditions is then labeled as a redeye.

Examples of redeye removal algorithms in this category include algorithms from Fotonation [9], Pixology [10], Xerox [11], Viewahead [12], and Kodak [13]. In [9], the red color segmentation is done in the CIELAB space by using thresholds L>40 and a>17. However the authors also claim that their color segmentation in the CIELAB space could be carried out equivalently in the RGB and YCbCr color space in order to reduce the computational complexity. In [10], the authors use the HSL color spaces to do the initial segmentation. They claim that "saturation" and "lightness" information is a better initial discriminator of redeye region than the color information ("hue"). The authors do use the "hue" information in the second step to check if red pixels are in the neighborhood of the regions selected in the first step. The algorithm in reference [11] is similar in the sense that segmentation and labeling is first done on the basis of specular reflection (strong white color) without looking for red colored pixels. The authors state that the specular reflection can be isolated by searching for pixels satisfying the following limits in the YCbCr color space: Y>200, −16<Cb<16, −8<Cr<24. Once specular blobs are isolated, the authors run subsequent tests to check whether the specular blobs are surrounded by red colored pixels. Reference [12] proposes segmenting the image in CIELAB or CIELUV color spaces by calculating colorimetric distance from "red" colors typically existing in redeyes. In [13], skin tone detection is carried out first and then red blobs that lie inside the skin region are searched.

3. First Preferred Embodiment

Figure 1:
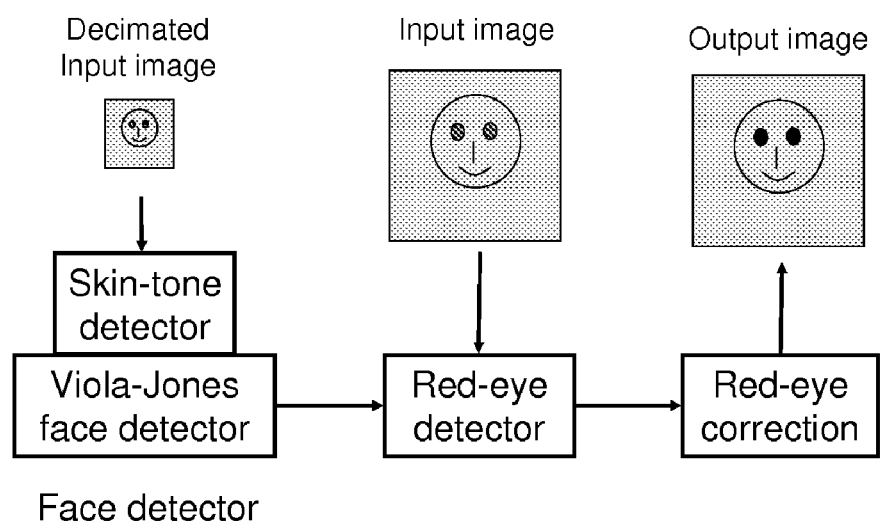
FIG. 1 show functional blocks of a preferred embodiment redeye correction.
Figure 2:
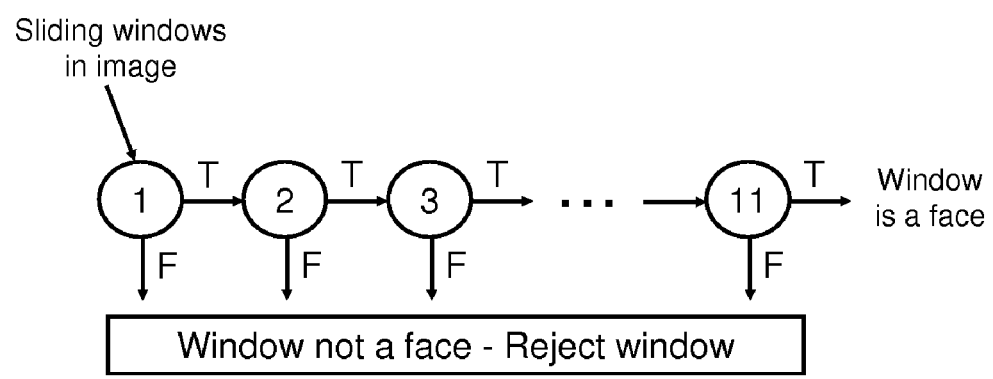
FIG. 2 illustrates cascade filtering.

FIG. 1 shows the block diagram of the first preferred embodiment redeye removal method. We feed a decimated version of input image to our face detector which includes a combination of a skin-tone detector followed by a Viola-Jones face detector. We decimate the input image before feeding it to our face detector to reduce computational complexity in face detection. The set of detected faces from the face detector is then processed by a redeye detector which operates in the Cr color space and does eye detection by using the Sung-Anderson method. The redeye detector operates on faces at the original image resolution. Once the redeye regions are isolated, they are corrected by the redeye correction block which reduces the chrominance information in the regions of the detected redeyes. Following sections 4 and 5 provide details as well as assessing computational complexity of each of the blocks.

4. Face Detection

The preferred embodiment face detector consists of a combination of a skin-tone detector and Viola-Jones face detector. It provides a nice balance between computational complexity and face detection rate when compared to face detection by using only the Viola-Jones technique which operates on the luminance component of the image. Our face detector operates on a square window of pixels and outputs a decision as to whether the square window contains a face or not. We carry out face detection in an image by scanning this square window face detector on all the pixels in the image and over multiple window sizes. Using multiple window sizes allows us to detect faces at multiple scales. The window sizes and the corresponding step-size that we use to shift the window in x- and y-direction are given in Table 1 below. The total number of sliding windows we get for a decimated input image of size 400×300 pixels is 96831 windows; that is, we search for 96831 possible face locations in the decimated input image.

| Window size | Step-size in x- and y-directions | Number of window locations |
|---|---|---|
| 24 | 2 | 26271 |
| 30 | 2 | 24975 |
| 36 | 2 | 24024 |
| 48 | 3 | 10030 |
| 60 | 4 | |
| 72 | 5 | |
| 96 | 6 | |
| 120 | 8 | |

Our face detector is a cascade of 11 stages as shown in FIG. 3. The input to the face detector is the set of sliding windows in the image. The output of each stage is a decision as to whether an input window is a face or not. The output of the final stage is the final decision of our multi-stage face detector when a face is detected. The first stage of our detector is a skin tone detector which outputs "True" when at least $\theta_s$ percent of the pixels in the window have a skin tone. We provide details on our skin tone detector in the next three subsections. The next 10 stages of our face detector are stages of a cascaded Viola-Jones face detector with inputs the windows which the skin tone detector outputs as "True". Subsequent subsections provide more details on the last 10 stages.

(a) Skin-Tone Pixel Detection in HSV Color Space

We carry out skin-tone detection in the HSV color space. HSV color space is a non-linear mapping of the RGB color space cube. The "hue" H, "saturation" S, and "value" V are given by the following equations where R, G, B denote the color values of the pixel. R, G, B are normalized so each lies in the range [0.0, 1.0]. Let MAX equal the maximum of (R, G, B) values of the pixels and let MIN equal the minimum of those values. Then:

$$H = (0 + (G - B)/(MAX - MIN)) \times 60 \quad \text{if } R = \text{Max}$$
$$= (2 + (B - R)/(MAX - MIN)) \times 60 \quad \text{if } G = \text{Max}$$
$$= (4 + (R - G)/(MAX - MIN)) \times 60 \quad \text{if } B = \text{Max}$$
$$S = (MAX - MIN)/MAX$$
$$V = MAX$$

The equations that we use for skin color detection are:

skinH=!((H>45)&(H<335))

skinS=((S>0.1)&(S<0.7))

skinV=(V>0.3)

skin=skinH&skinV&skinS

If skin=1 at the end of above calculation, then we say that the pixel has a skin color. We obtained the above skin color detection equations by examining skin regions from a redeye image database of 117 images. We execute the skin color detection calculations for all pixels of the decimated input image and create a binary "skin map" with "1" denoting a skin color pixel and "0" denoting other pixels (b) Skin Coverage and Skin Tone We calculate the skin coverage (i.e. total number of skin color pixels) in a given input window by adding the skin map values in that window. The skin-tone detector then outputs a "True" for the input window if the skin coverage in the window is at least $\theta_s$ percent of the total number of pixels in the window.

If the window size is w×h then we need about wh additions to calculate the skin coverage given the skin map. We reduce the number of computation required to calculate the skin coverage of a window by using the concept of "integral images" or summed area tables (SAT). The use of SATs to efficiently calculate features in a face was first proposed by Viola and Jones. We apply SATs to efficiently calculate skin coverage.

(c) Skin Coverage with Summed Area Tables

Figures 3A, 3B:
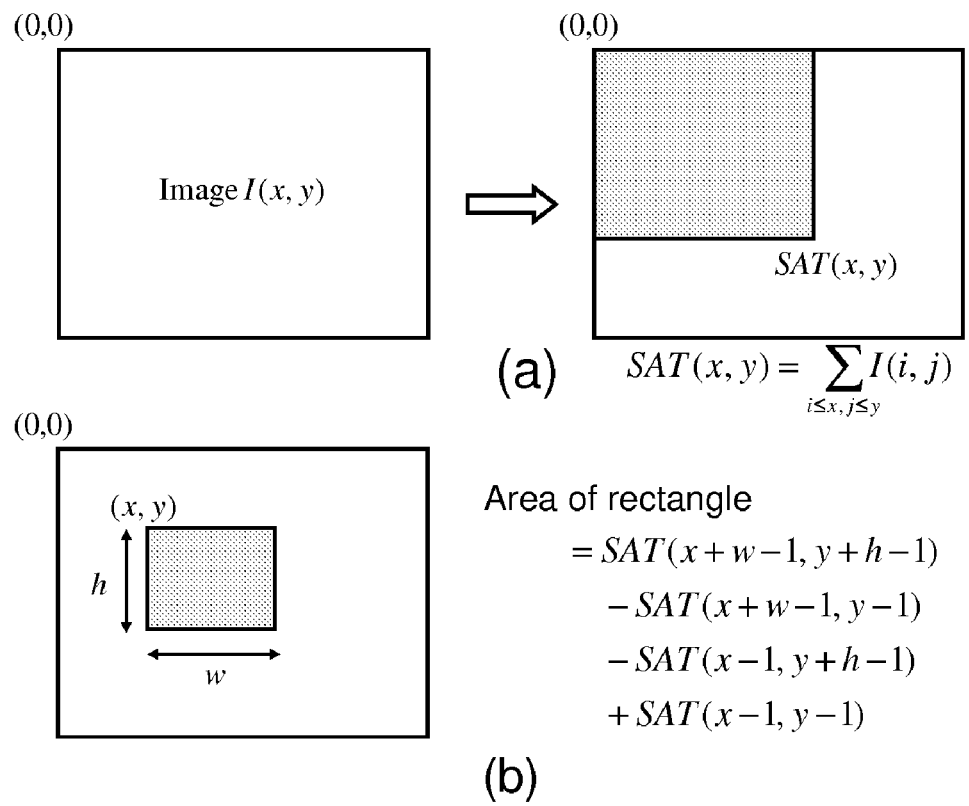
FIGS. 3a-3b are sum of area table rectangles.

Given an input image I(x,y) of dimension n×m, we create another array, SAT(x,y), of dimension (n+1)×(m+1). SAT(x,y) is the sum of all pixels in the image sub-rectangle with top-left corner (0,0) and bottom-right corner (x,y) as shown in FIG. 3a.

$$SAT(x,y) = \sum_{i \leq x, j \leq y} I(i,j)$$

SAT(x,y) can be efficiently calculated by using the following recursion:

SAT(x,y)=SAT(x,y−1)+SAT(x−1,y)+I(x,y)−SAT(x−1,y−1)

with initial conditions:

SAT(x,−1)=SAT(−1,y)=SAT(−1,−1)=0

By using SAT(x,y) we can efficiently calculate the pixel sum of any rectangular region by just four memory reads and three additions/subtractions as shown in FIG. 3b. The pixel sum of a rectangle of dimension w×h at location (x,y) is given by:

PixelSum(x,y;w,h)=SAT(x+w−1,y+h−1)−SAT(x+w−1,y−1)−SAT(x−1,y+h−1)+SAT(x−1,y−1)

We use SAT to speed up the skin coverage calculations as follows: Given the skin map we first construct its SAT. Given the SAT array we can efficiently calculate the skin coverage inside a window (x, y; w, h) by calculating PixelSum(x, y; w, h) by using the foregoing equation. This requires four memory reads and three adds/subtracts to calculate the skin coverage inside a window instead of wh memory reads and adds/subtracts required by the direct method of adding all skin map pixels in the window. Note that since we are using sliding windows to search for potential faces, the direct method can also be optimized in an alternate way by calculating partial sums of overlapping regions of adjacent windows. Our SAT-based method is still faster than the partial sum method by a factor of about 16× for windows of size 24×24 and more for larger windows.

(d) Cascaded Face Detector

Image windows that pass the first stage of our face detector (which is the skin tone detector) are fed into a cascaded face detector. Stages 2-11 of our face detector form a cascaded Viola-Jones face detector. Each stage of the cascade operates on image windows that pass the previous stage. An overwhelming majority of windows in an image do not contain faces. Therefore the cascade is constructed in such a way that it rejects as many windows without faces as possible at the earliest stage possible.

The Viola-Jones face detector operates on the luminance component of the input image. Each stage of the detector forms what is called a "strong" classifier. Each "strong" classifier is a linear combination of "weak" classifiers. The AdaBoost algorithm is used for training the classifiers. Given a set of positive (face-containing) and negative (no face) training examples and a huge set of weak classifiers, the AdaBoost algorithms first selects a user-determined number T of weak classifiers from the huge set of possible weak classifiers. Let $h_t(x)$ for $t=1, 2, \ldots, T$ be the set of selected T weak classifiers (here x denotes the data vector that needs to be classified). The final strong classifier is then constructed as:

$$h(x) = 1 \quad \text{if} \quad \sum_{1 \le t \le T} \alpha_t h_t(x) \ge 0.5 \sum_{1 \le t \le T} \alpha_t$$
$$= 0 \quad \text{otherwise}$$

where $\alpha_t$ are constants determined by the AdaBoost algorithm during the training phase.

AdaBoost is a powerful machine learning technique. The weak classifiers are required to be only better than chance; i.e., on the average they should be at least 50+% accurate in their classification. Hence they can be very simple. However, when the weak classifiers are combined into a strong classifier, very good classification performance is achieved. Subsequent subsections provide more details of the last 10 stages of the face detector.

(e) Preprocessing

The image windows sent to the last 10 stages of the face detector are normalized first to take care of lighting variations in the input image. Let Y(x,y) denote the luminance component of the decimated input image. Image window normalization can be achieved as follows:

$$\tilde{Y}(x,y) = Y(x,y)/\sigma$$

where $\sigma^2$ is the variance of the image window. Recall that $\sigma^2 = E\{Y^2\} - E\{Y\}^2$. The mean $E\{Y\}$ can be efficiently calculated by using SAT of Y(x,y). The mean $E\{Y\}$ requires calculation of the sum of all pixels in the image window which can be calculated by using PixelSum( ) from SAT of Y(x,y). $E\{Y^2\}$ requires calculation of a sum of squared pixels; hence a second set of SAT for $Y^2(x,y)$ is constructed. $E\{Y^2\}$ of the image window is calculated by using PixelSum( ) from SAT of $Y^2(x,y)$. Instead of normalizing all pixel values using the variance as above, the same effect can be achieved by normalizing "features" used in the face detector.

"Features" are explained in the next subsection.

(f) Rectangular Features

Figure 4:
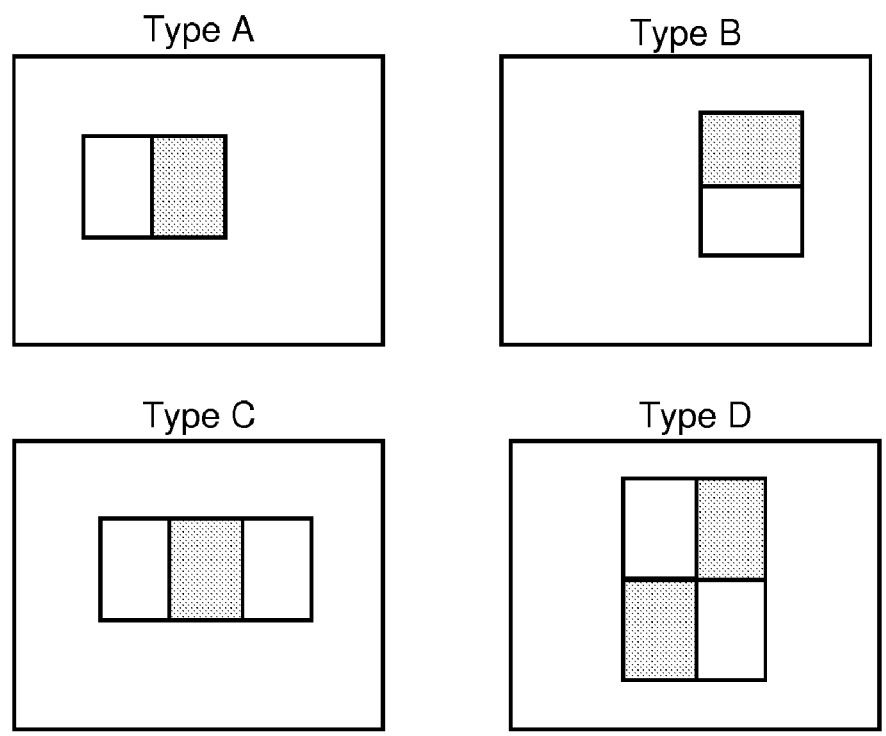
FIG. 4 shows weak features.

Viola and Jones proposed four types of "features" that lead to the weak classifiers. The four types of features are shown in FIG. 4. Type A and Type B features are two-rectangle features, a Type C feature is a three-rectangle feature, and a Type D is a four-rectangle feature. A two-rectangle feature is calculated as the difference between the sum of pixels in gray shaded rectangle and the sum of pixels in rectangle with no shading. The gray shaded rectangle of a feature has the same size and shape and is adjacent to the unshaded rectangle. The remaining features are calculated in a similar fashion as the difference between the sum of pixels in gray shaded rectangles and the sum of pixels in rectangles with no shading. Once a feature f is calculated, a corresponding weak classifier is computed as:

$$h = 1 \quad \text{if} \quad p\theta < pf$$
$$= 0 \quad \text{otherwise}$$

where θ is a threshold and p is the parity (e.g., whether the left or the right rectangle of Type A feature is the gray-shaded rectangle), both of which are selected during the training phase.

The number of possible features within a window is huge. For example, features of Type A are obtained by translating various scaled version of the two adjacent rectangles along all possible displacements in the x- and y-direction within a window. Since there are several possible translations and scale factors, the number of features is huge when compared to the number of pixels in the window. The table below lists the number of features possible for each type for a window of size 24×24.

| Feature type | Number of features |
| --- | --- |
| A | 43200 |
| B | 43200 |
| C | 27600 |
| D | 20736 |
| Total | 134736 |

The total number of possible features for window of size 24×24 is 134736. This implies that are 134736 possible weak classifiers for a window of size 24×24. The AdaBoost algorithm is used to select a user determined number T of weak classifiers for each stage from this huge set of 134736 possible weak classifiers.

Each of the weak classifiers is simple and requires just calculating the corresponding features and thresholding the features as noted above. Since the features involve calculation of pixel sums of rectangular areas of pixels, they can be efficiently calculated by using summed area tables.

(g) Cascade

Each stage of Stages 2-11 of the preferred embodiment face detector is a strong classifier as previously noted:

$$h(x) = 1 \text{ if } \sum_{1 \le t \le T} \alpha_t h_t(x) \ge 0.5 \sum_{1 \le t \le T} \alpha_t$$
$$= 0 \text{ otherwise}$$

As mentioned earlier $\alpha_t$ and $h_t(\ )$ are selected by the AdaBoost algorithm during training. In particular, this AdaBoost selection roughly proceeds as follows:

(1) Provide a set of training images $(x_1, F_1), (x_2, F_2), \ldots, (x_x, F_K)$ where $F_k=0, 1$ depending upon whether the training image is negative (contains no face) or positive (a face which approximately fills up the image). These training images are all the same size, such as 24×24 or 120×120, and will correspond to the sub-windows in images during face detection.

(2) Provide each training image with a weight which will be iteratively updated and used to determine the classifier. Initially, take $w_{1,k}$ as the weight for the k-th training image, and set $w_{1,k}=\frac{1}{2}n, \frac{1}{2}m$ for $F_k=0, 1$, respectively, where n, m are the number of negative and positive images, respectively. Note that this normalizes the initial weights so that $\Sigma_{1 \le i \le N} w_{1,k}=1$.

(3) Iterate T times (t=1, 2, ..., T) the following steps (i)-(iv):
  i. proceed through all features $f_j$ to be considered (e.g., the rectangular features of FIG. 4) to compute the corresponding weak classifier error for the training images and current weights: $e_j=\Sigma_{1 \le k \le K} w_{t,k}|h_j(x_k)-F_k|$ where the weak classifier is as previously described: $h_j(x_k)=1, 0$ when $p_j \theta_j < p_j f_j(x_k)$ or not, respectively, where $f_j(x_k)$ is the number of pixels in the gray-shaded feature rectangle minus the number in the unshaded rectangle for training image $x_k, \theta_j$ is the threshold, and $p_j$ is the parity.
  ii. select the weak classifier for the t-th iteration as that with the smallest error; denote this weak classifier as $h_t$ and the smallest error as $e_t$.
  iii. update the weights by $w_{t+1,k}=w_{t,k} \beta_t$ or $w_{t,k}$ when $x_k$ is correctly classified or not, respectively, where $\beta_t=e_t/(1-e_t)$. Thus correct classification of the k-th training image by the selected weak classifier decreases the weight of that image.
  iv. normalize the updated weights by $w_{t+1,k}=w_{t+1,k}/\Sigma_{1 \le i \le K} w_{t+1,i}$ for use in the next iteration.

(4) Define the strong classifier as $h(x)=1, 0$ if $\Sigma_{1 \le t \le T} \alpha_t h_t(x) \ge 0.5 \Sigma_{1 \le t \le T} \alpha_t$ or not, respectively, where $\alpha_t=-\log \beta_t$.

The stages and the number of weak classifiers used in each stage in our face detector are given in the table below.

| Stage number | T (number of weak classifiers) |
| --- | --- |
| 2 | 2 |
| 3 | 5 |
| 4 | 20 |
| 5 | 20 |
| 6 | 20 |
| 7 | 50 |
| 8 | 50 |
| 9 | 100 |
| 10 | 100 |
| 11 | 100 |

Note that Stage 2 of our face detector makes use of only two weak classifiers. Hence, it is computationally very efficient. It is very effective in rejecting most of the simple non-face image windows input into it. These rejected image windows are not processed by subsequent stages. Each stage of the cascade rejects increasingly complex non-faces where as passing potential faces input to it.

(h) Post Processing

The Viola-Jones face detector is insensitive to small changes in translation and scale. Hence, multiple detections will usually occur around each face in scanned images. We would like to have only one detection per face. So we post process the detected windows in order to combine overlapping detections into a single detection. We first partition the set of detections into disjoint subsets. Two detections are in the same subset if their overlapping area is more than 40% the area of their windows. We then calculate the mean of corners of all windows in a disjoint set to get corners of the final detection.

(i) Complexity of the Face Detector

Since the preferred embodiment face detector is a cascaded detector not all stages of the detector get used in all image windows. Hence, the computational complexity of our face detector is input data dependent. The overall complexity of the face detector depends on the probability with which each stage of the detector gets used. To calculate this probability we ran our face detector on our database of 117 images and calculated the number of times each stage gets used over this set of images. Using this information we calculated the empirical probability with which each stage gets used in our face detector. We list the various probabilities in the following table. For comparison purposes we also list the probability with which each stage gets used in a Viola-Jones face detector which does not use skin-tone detection.

| Stage number | Probability of use of each stage for our face detector | Probability of use of each stage for Viola-Jones face detector (no skin-tone detection) |
| --- | --- | --- |
| 1 | 1.0000 | 0 |
| 2 | 0.1445 | 1.0000 |
| 3 | 0.0369 | 0.1912 |
| 4 | 0.0283 | 0.1459 |
| 5 | 0.0169 | 0.0911 |
| 6 | 0.0064 | 0.0375 |
| 7 | 0.0029 | 0.0168 |
| 8 | 0.0013 | 0.0069 |
| 9 | 0.0005 | 0.0026 |
| 10 | 0.0003 | 0.0012 |
| 11 | 0.0002 | 0.0007 |

Our face detector ends up taking fewer cycles on the average because our skin-tone detector (which is the first stage of our face detector) is simpler than a 2-stage strong classifier (which is the first stage of the traditional Viola-Jones face detector). Also our skin-tone detector is more effective in rejecting non-faces than the 2-stage strong classifier which forms Stage 1 of the traditional Viola-Jones face detector. Thus a smaller number of potential faces get processed by subsequent stages. The following table lists the percent of total number of windows rejected by each stage of the cascaded classifier; this table was obtained from the preceding table.

| Stage number | Percent of total windows rejected by various stages of our face detector | Percent of total windows rejected by various stages of Viola-Jones face detector (no skin-tone detection) |
| --- | --- | --- |
| 1 | 85.54 | 0 |
| 2 | 10.75 | 80.87 |

| Stage number | Percent of total windows rejected by various stages of our face detector | Percent of total windows rejected by various stages of Viola-Jones face detector (no skin-tone detection) |
|---|---|---|
| 3 | 0.86 | 4.53 |
| 4 | 1.14 | 5.47 |
| 5 | 1.04 | 5.36 |
| 6 | 0.35 | 2.07 |
| 7 | 0.15 | 0.98 |
| 8 | 0.07 | 0.43 |
| 9 | 0.02 | 0.13 |
| 10 | 0.00 | 0.05 |
| 11 | 0.01 | 0.03 |

5. Redeye Detection

Figure 5:
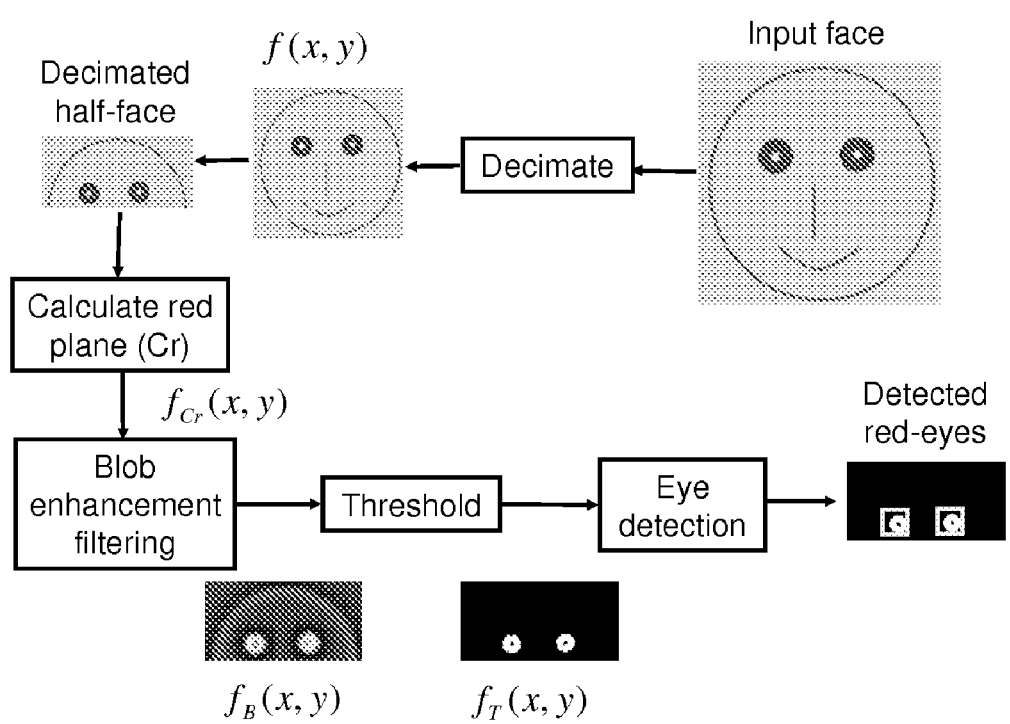
FIG. 5 illustrates redeye correction.

FIG. 5 shows the block diagram of the preferred embodiment redeye detector. The input to the detector is a detected face from our face detector. Since our face detector operates on a decimated version of the input image and outputs decimated face coordinates, we scale up the face coordinates to the original resolution. If the resulting face is larger than 240×240, we decimate the face to a resolution less than 240×240 before using it for redeye detection. Let f(x,y) denote the decimated input face. We deal with frontal and mostly upright faces; hence we operate on only the top half of the input face. In the first step we calculate a color plane which contains the redness information of the input image. We do this by calculating the Cr component of the input image. Let $f_{Cr}(x,y)$ denote the Cr component of the input face. We chose to use the Cr component since it's usually available for other purposes such as JPEG compression. We then pass the Cr component of the face through a blob enhancement filter which enhances small blob shaped red regions while suppressing large fairly uniform colored regions such as the face. Let $f_B(x,y)$ denote the output of the blob enhancement filter. We then threshold $f_B(x,y)$ to obtain a binary image, $f_T(x,y)$, in which the potential redeye regions have a "1" as shown in FIG. 5. This binary image is then fed to the eye detection module which detects two blobs that are most likely to be redeyes. We use a fast version of the Sung-Anderson method in our eye detector. In the next few subsections we explain the constituent blocks of our redeye detector in more detail.

(a) Blob Enhancement Filter

Figure 6:
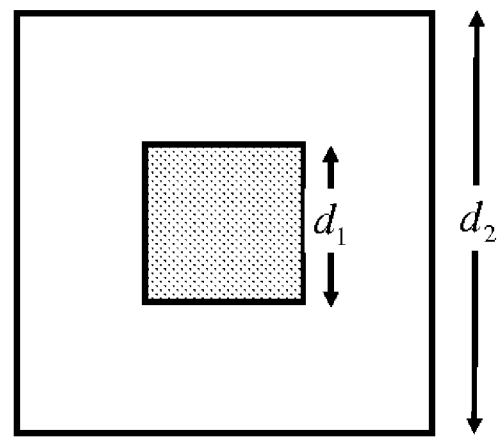
FIG. 6 shows a filter.
Figure 7:
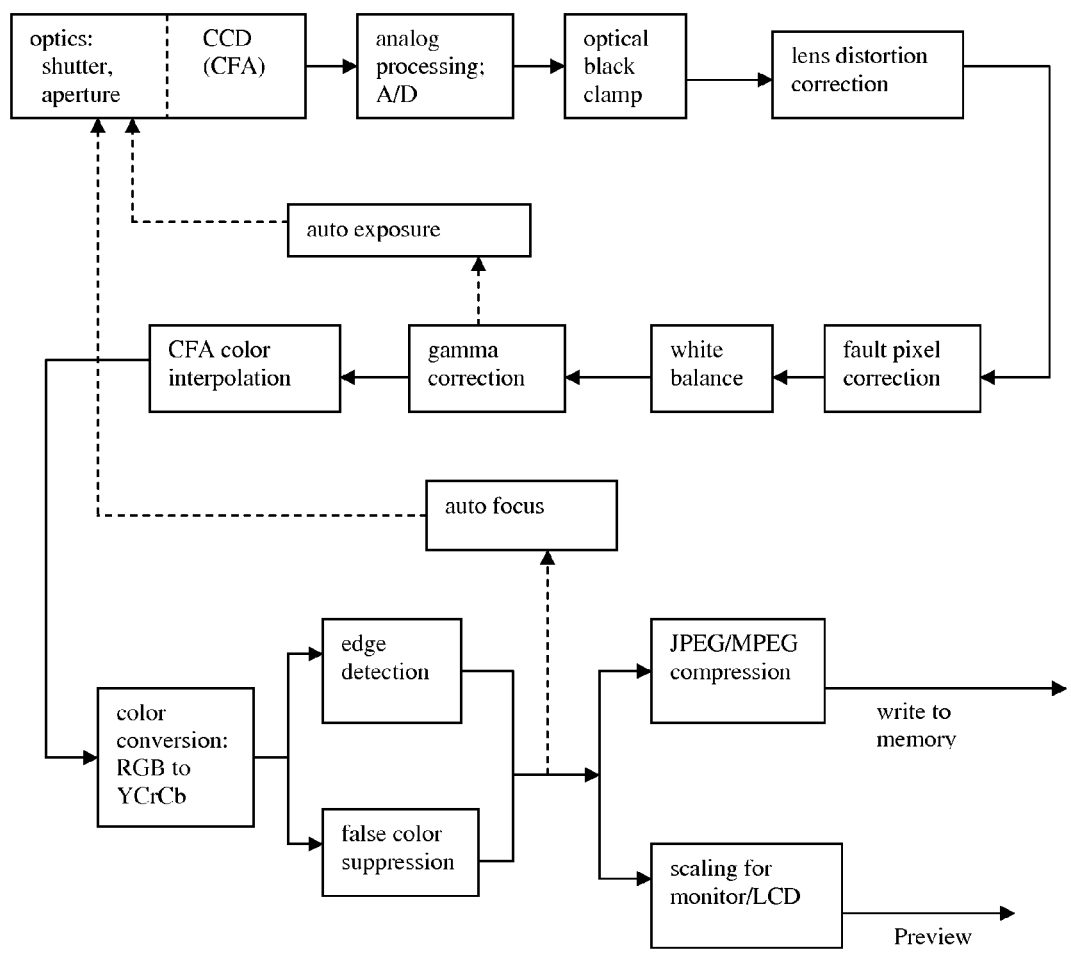
FIGS. 7-8 illustrate known digital camera image pipeline and red-eye correction.
Figure 8:
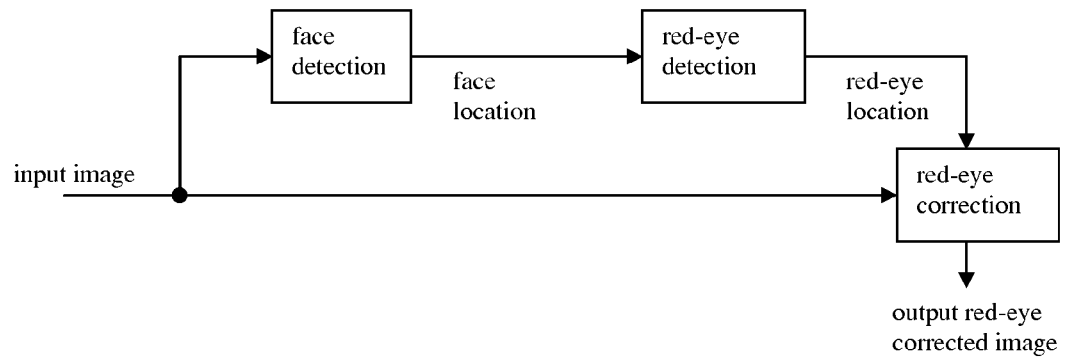

The blob enhancement filter is an extension of the point detector shown in FIG. 6a. The output of the point detector will peak whenever the point detector is on an isolated point in an area of constant or nearly constant intensity in an image. The blob enhancement filter extends this principle to detect small areas of redness surrounded by areas of low redness. The filter impulse response of the blob enhancement filter is defined by two concentric squares as shown in FIG. 6b. The impulse response has a value of $k_1/d_1^2$ in dark shaded region and a value of $-k_2/(d_2^2-d_1^2)$ in the unshaded region. The output of the filter will peak when $d_1$ is close to the size of the redeye. Since we know the input face size and since the eye size is proportional to the face size, we vary $d_1$ depending on the size on the input face. Since the blob enhancement filter is constant over square regions, we use SAT of $f_{Cr}(x,y)$ to calculate the output of the filter by calculating the areas of the two concentric squares and taking their difference. The output of the blob enhancement filter is denoted by $f_B(x,y)$.

(b) Thresholding

The output of the blob enhancement filter, $f_B(x,y)$, is thresholded to obtain a binary image, $f_T(x,y)$ in which the potential redeye regions have a "1". We use an adaptive threshold that depend on the maximum and minimum values of $f_B(x,y)$ to threshold $f_B(x,y)$. The adaptive threshold is calculated only once per input face. Let $f_{B,MAX}$ and $f_{B,MIN}$ denote the maximum and minimum values, respectively, of $f_B(x,y)$. The thresholded binary image $f_T(x,y)$ is then calculated as follows:

$$f_T(x, y) = 1 \quad \text{if } f_B(x, y) > 0.7^*(f_{B,MAX} - f_{B,MIN}) + f_{B,MIN}$$

$$= 0 \quad \text{otherwise}$$

If $f_{B,MAX} > 0.03$, then we decide that a redeye exists, else we decide that there is no redeye in the input face. If the number of "1" pixels in $f_T(x,y)$ is greater than 0.15*decimatedFaceWidth*decimatedFaceHeight, we conclude that there are no redeyes in the face and do not continue with the steps below.

(c) Eye Detection

Given $f_T(x,y)$, the eye detection method outputs the position and size of the redeye as shown in FIG. 5. FIG. 5 shows the idealized case of perfectly round and isolated redeyes with no other clutter. In practice, the redeye region is not always round and can have an irregular shape; $f_T(x,y)$ can also have other clutter since the eyelids and the face can have a strong red component. We use the method similar to Sung and Anderson for detection of the redeye region. Note that an alternative approach to detect redeye regions would be to use Hough transform for circle detection. The first preferred embodiment uses the Sung-Anderson method to detect redeyes instead because the redeye region is not always round and can have an irregular shape.

(d) Detection of a Single Redeye

The Sung-Anderson method locates areas in binary images ($f_T(x,y)$ in our case) that have the highest concentration of "1" pixels. The redeye region is assumed to be square with parameters {x, y, s} where (x,y) denotes the upper-left corner of the redeye region with y the horizontal coordinate and x the vertical coordinate (contrary to usual analytic geometry), and s denotes the width of the square that contains the redeye region. Note that Sung and Anderson consider round regions. Following others, we assume a square model in our method. Given s one can easily determine (x,y) by using block matching to determine the s×s block in $f_T(x,y)$ that contains the maximum number of "1" pixels. However, in our case s is also unknown. Thus we have to search for the best matching block for all possible values of s. Let n denote the actual number of "1" pixels within the square model. Using a maximum likelihood method and least squares fitting methods, Sung and Anderson show that the best value for s is the one that maximizes $$M = 2n - s^2$$

Pseudocode of their method is given below. Let (w, h) be the width and height of $f_T(x,y)$. The possible redeye region sizes that we search for are $s_{max}$=round(min(w,h)*0.1) to $s_{min}$=4. We assume that the largest redeye size is about 10% of the face size.

```
[w, h] = size(f_T);
s_max = round (min (w, h) *0.1); % Assume largest eye size is
        10% of face size
s_min = 4;
M = -s^2;
```

```
for s=s_max to s_min,
    M_old = M;
    for i = 1:2:h-s+1,
        for j = 1:2:w-s+1,
            Step A: Find the s × s block with the maximum number
            of "1" pixels say n;
        end;
    end;
    M = 2*n - s^2;
    if(M > M_old)
        Step B: Then make that block the best redeye model.
    else
        Step C: break;
    end;
end;
```

The main step in the above algorithm (Step A) is the search for s×s block with the maximum number of "1" pixels. Step A provides us with the best (x,y) for each value of s. Step B in the above calculates the optimum value of s. Let $(x_o, y_o, s_o)$ be the selected optimal redeye model parameters. Note that if Step C is executed in the first iteration, then we have no redeye region.

Computational optimizations: To efficiently calculate the number of "1" pixels within an s×s block we make use of summed area table of $f_T(x,y)$. We require only 3 additions/subtractions and four memory lookups to calculate the number of "1" pixels inside a block. If we used the direct method we would require $s^2$ additions and $s^2$ memory accesses. As in the case of skin coverage calculation, by using SAT we save a significant amount of computational complexity. The computational savings is about a factor 5× over the direct method using partial sums.

(e) Detection of the Second Redeye

At the end of the detection of the first redeye, we get the set $(x_o, y_o, s_o)$ of parameters. Since they belong to the first redeye let us call them $(x_{o1}, y_{o1}, s_{o1})$. To detect the second redeye, we remove "1" pixels corresponding to the first redeye from the binary image $f_T(x,y)$ and pass it through the single redeye detection process of the previous section to detect a possible second redeye. Let $(x_{o2}, y_{o2}, s_{o2})$ denote the output of the second eye detection.

(f) Matching the Sizes of Two Redeyes

In this step we match the size of the two redeyes and make the sizes proportional to distance between the redeyes. Let $(x_{c1}, y_{c1},)$ be the center of the first redeye and $(x_{c2}, y_{c2})$ be the center of the second redeye. $(x_{c1}, y_{c1})$ and $(x_{c2}, y_{c2})$ can be easily calculated from their respective $(x_o, y_o, s_o)$'s. The redeyes are assumed to be within a rectangular box of size 2 dx×2 dy centered around $(x_{c1}, y_{c1})$ and $(x_{c2}, y_{c2})$ where dx=dy=0.1*abs($y_{c2}-y_{c1}$).

(g) Validating the Two Redeye Locations

The detected redeyes at this stage could be false detects. Most of the false detects are eliminated by using the following set of heuristics:

1. If (abs($x_{c2}-x_{c1}$)<0.3*faceHeight and abs($y_{c2}-y_{c1}$)> 0.3*faceWidth), then the redeye pair is a valid redeye pair. This heuristic rejects redeyes that are very close to each other.
2. Let (t1, b1, l1, r1) denote the top, bottom, left, and right edges of the bounding box for the first redeye. Let (t2, b2, l2, r2) denote the top, bottom, left, and right edges of the bounding box for the second redeye. if((l1<round(0.05*faceWidth) and l2>round(0.95*faceWidth)) or (l2<round(0.05*faceWidth) and l1>round(0.95*faceWidth))), then reject redeye pair. This heuristic rejects redeyes that are near the edge of the face.
3. If the variance of the Cr component in the redeye bounding box is less than 0.00035, then we reject the redeye. This case occurs when a facial region is falsely detected as a redeye. The Cr variation in a facial region is very low.

6. Redeye Correction

Within the redeye bounding boxes, a determination of whether the pixel is red in color is made. Let H, S, V denote the Hue, Saturation, Value of the pixel under test. We say the pixel is red in color if redpixel is '1' in the following equation:

redPixelH=!(*H*>25&*H*<310)

redPixelS=(*S*>0.4)

redPixelV=(*V*>0.2)

redPixel=redPixelH&redPixelS&redPixelV

The YCbCr component of the red pixel is modified as follows:

$Y(x,y)=0.9*Y(x,y)$ $Cr(x,y)=0.5$ $Cb(x,y)=0.5$

Setting the Cr and Cb components to 0.5 essentially removes the chrominance information thereby removing the red color in the redeye regions.

We also use another heuristic in this stage to reject false detects. If the number of red pixels within a redeye bounding box is less than 4% the number of pixel in the redeye bounding box, then we reject the red eye.

7. Two-Pass Version of the Redeye Removal Algorithm

A further preferred embodiment improves the redeye detection accuracy by use of a two-pass version of the redeye detection method.

Modification to the face detector: In the first pass we use square windows as listed in Table 1. In the second pass we use rectangular scanning windows with a width to height aspect ratio of 1.15:1.

Modifications to the redeye detector: In the first pass, we threshold the blob enhancement filter output by using the following equation and carry our red eye detection on the thresholded image.

$$f_T(x, y) = 1 \quad \text{if } f_B(x, y) > 0.5^*(f_{B,MAX} - f_{B,MIN}) + f_{B,MIN}$$
$$= 0 \quad \text{otherwise}$$

If no redeyes are detected, then in the second pass we increase the threshold as follows:

$$f_T(x, y) = 1 \quad \text{if } f_B(x, y) > 0.7^*(f_{B,MAX} - f_{B,MIN}) + f_{B,MIN}$$
$$= 0 \quad \text{otherwise}$$

and carry out redeye detection again.

8. Modifications

The preferred embodiments can be modified in various ways while retaining one or more of the aspects of a cascaded face detector with an initial skin color detection stage and subsequent feature detection stages and a eye detection with sum of area tables.

For example, the sizes of the sliding windows could be varied, the number of weak classifiers used in the strong classifier for a stage could also be varied.

What is claimed is:

1. A redeye detection method of a processor, comprising the steps of:
    (a) providing a red plane of a portion of a face image, wherein the face is detected by a two pass process via a processor;
    (b) blob enhancement filtering of said red plane in the processor, said filtering using sum of area tables for said red plane;
    (c) thresholding said blob-enhancement-filtered red plane; wherein the thresholding blob-enhancement-filter utilizes the equation wherein $f_B(x,y)$ is the output of the blob enhancement filter, and $f_{B,MAX}$ and $f_{B,MIN}$ are the maximum and the minimum values of $f_B(x,y)$, respectively $$f_T(x, y) = \begin{cases} 1, \text{ if } f_B(x, y) > 0.5^*(f_{B,MAX} - f_{B,MIN}) + f_{B,MIN} \\ 0, \text{ otherwise} \end{cases};$$

and
    (d) eye detection in said thresholded red plane.

2. The redeye detection method of claim 1, wherein the two pass process comprises a first pass utilizing at least one square window and a second pass utilizing at least one rectangular scanning window.

3. The redeye detection method of claim 2, where in the rectangular scanning window comprises a width to height ration of 1.15:1.

4. The redeye detection method of claim 1, wherein the thresholding is performed in the first pass.

5. The redeye detection method of claim 1, wherein when the first pass does not detect red eyes, the thresholding utilizes the equation wherein $f_B(x,y)$ is the output of the blob enhancement filter, and $f_{B,MAX}$ and $f_{B,MIN}$ are the maximum and the minimum values of $f_B(x,y)$, respectively $$f_T(x, y) = \begin{cases} 1, \text{ if } f_B(x, y) > 0.7^*(f_{B,MAX} - f_{B,MIN}) + f_{B,MIN} \\ 0, \text{ otherwise} \end{cases}.$$

* * * * *